United States Patent
Schmidt et al.

(10) Patent No.: US 11,052,612 B2
(45) Date of Patent: Jul. 6, 2021

(54) ADHESIVE BONDLINE SPACER CLIP

(71) Applicant: Volvo Car Corporation, Gothenburg (SE)

(72) Inventors: Marcus Schmidt, Åsa (SE); Zef Van Der Putten, Alingsas (SE)

(73) Assignee: Volvo Car Corporation, Gothenburg (SE)

( * ) Notice: Subject to any disclaimer, the term of this patent is extended or adjusted under 35 U.S.C. 154(b) by 118 days.

(21) Appl. No.: 16/379,895

(22) Filed: Apr. 10, 2019

(65) Prior Publication Data
US 2019/0315071 A1 Oct. 17, 2019

(30) Foreign Application Priority Data
Apr. 13, 2018 (EP) ..................................... 18167276

(51) Int. Cl.
| | |
|---|---|
| B29C 65/78 | (2006.01) |
| B23Q 3/18 | (2006.01) |
| B29C 65/52 | (2006.01) |

(52) U.S. Cl.
CPC .......... B29C 65/7826 (2013.01); B23Q 3/18 (2013.01); B29C 65/52 (2013.01)

(58) Field of Classification Search
CPC ........ B60J 1/005; B23Q 3/18; B29C 65/7826; B29C 65/52
See application file for complete search history.

(56) References Cited

U.S. PATENT DOCUMENTS

| | | | |
|---|---|---|---|
| 4,248,933 A * | 2/1981 | Katoh | ..................... B32B 15/08 |
| | | | 428/339 |
| 4,531,335 A | 7/1985 | Mangan | |
| 4,606,159 A | 8/1986 | Kunert | |
| 6,276,748 B1 | 8/2001 | Gobessi et al. | |

(Continued)

FOREIGN PATENT DOCUMENTS

| | | |
|---|---|---|
| CN | 201768031 U | 3/2011 |
| CN | 202443249 U | 9/2012 |

(Continued)

OTHER PUBLICATIONS

Oct. 10, 2018 European Search Report issue on International Application No. EP18167276.

(Continued)

Primary Examiner — Vishal I Patel
(74) Attorney, Agent, or Firm — Clements Bernard Walker; Christopher L. Bernard

(57) ABSTRACT

A spacer clip for ensuring a minimum adhesive bond line thickness (T) during an attachment event with an adhesive, the spacer clip including: a spacer element having a thickness (t) defining the minimum bond line thickness, adapted to be arranged interleaved between a first vehicle part and a second vehicle part, a hold portion generally parallel with the spacer element and attached to the spacer element with an interconnecting portion. The spacer clip is mountable on the first vehicle part. The hold portion is adapted to be arranged on an opposite side of the first vehicle part compared to the spacer element. The spacer element and the hold portion are adapted to maintain a pressure on the first vehicle part such that the spacer clip can be mounted on the first vehicle part prior to the attachment event.

8 Claims, 4 Drawing Sheets

(56) References Cited

U.S. PATENT DOCUMENTS

2010/0143722 A1  6/2010 Anderson et al.
2013/0276419 A1  10/2013 Oehlsen

FOREIGN PATENT DOCUMENTS

| CN | 106182757 A | 12/2016 |
| CN | 206809960 U | 12/2017 |
| EP | 0556508 A | 8/1993 |
| EP | 0691231 A | 1/1996 |
| FR | 2952995 A1 | 5/2011 |
| FR | 2959172 A1 | 10/2011 |
| JP | 4329913 B1 | 9/2009 |
| WO | 9958355 A1 | 11/1999 |
| WO | 2008153484 A1 | 12/2008 |

OTHER PUBLICATIONS

Office Action and Search Report issued in the corresponding CN application No. 201910270170.4.
Office Action issued in the corresponding CN application No. 201910270170.4.
Search Report issued in the corresponding CN application No. 201910270170.4.

* cited by examiner

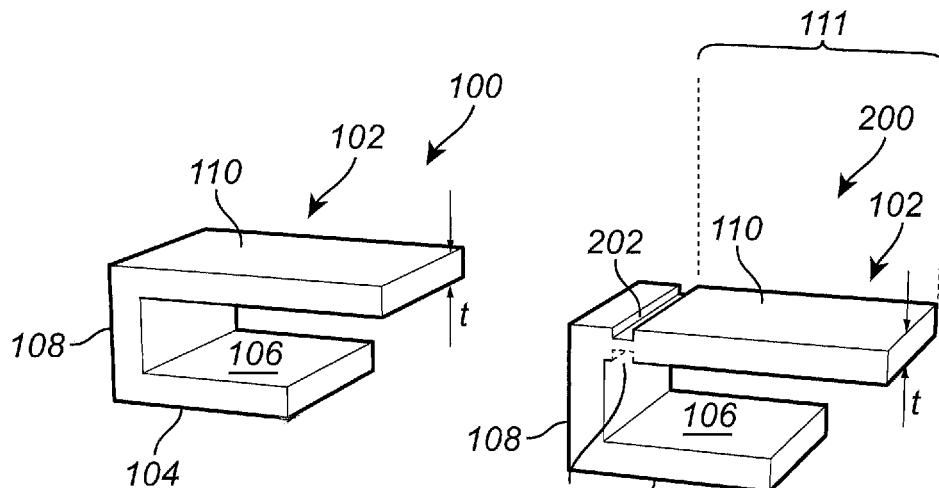
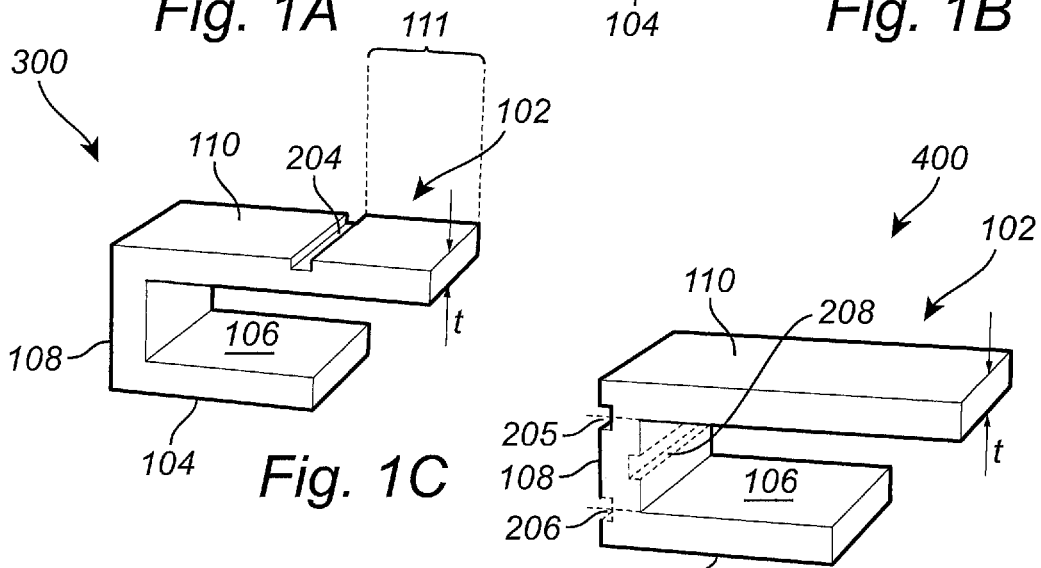
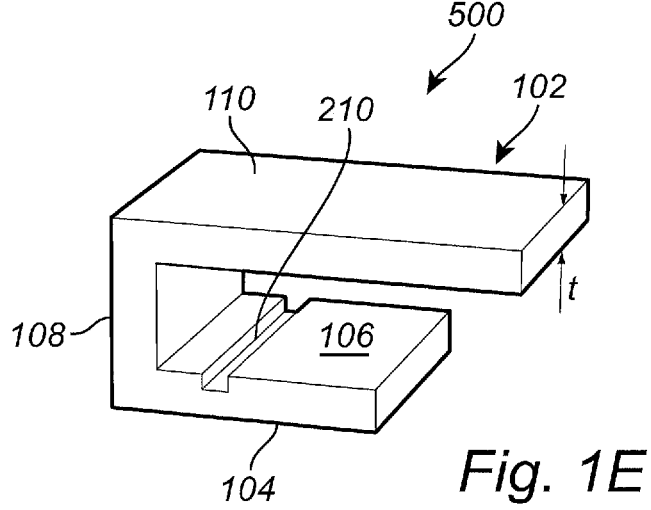

ADHESIVE BONDLINE SPACER CLIP

CROSS-REFERENCE TO RELATED APPLICATION

The present patent application/patent claims the benefit of priority of co-pending European Patent Application No. 18167276.7, filed on Apr. 13, 2018, and entitled "AN ADHESIVE BONDLINE SPACER CLIP," the contents of which are incorporated in full by reference herein.

TECHNICAL FIELD

The present invention relates to a spacer clip for ensuring a minimum adhesive bond line thickness during an attachment event for attaching a first vehicle part with a second vehicle part. The present invention also relates to a method for attaching a first vehicle part and a second vehicle part to each other.

BACKGROUND

In the assembly of a vehicle, some of the vehicle parts are bonded to each other with an adhesive. The performance of the adhesive depends on the adhesive itself but also for instance on the preparation of the vehicle parts surfaces in the bond line between the parts and on the bond line thickness.

The thickness and uniformity of the bond line between the vehicle parts is of high importance for the quality of the bond joint. A non-uniform bond line may cause air pockets and stress in the cured adhesive in the bond line area. Furthermore, a too thin or too thick bond joint between the vehicle parts may not provide the desired strength or stress acceptance of the bond.

One way to control the thickness of the bond line is described in US2010/0143722, which discloses to use an adhesive which contains beads of a desired size for the bond line thickness.

However, since it is the beads that define the bond line thickness, and the beads are part of the adhesive, it is relatively cumbersome to change the bond line thickness from a one thickness for one bond to joint to another second thickness for another bond joint. Further, the size distribution of the beads may not be sufficiently narrow to provide the desired uniformity of the bond line. In addition, the beads may be too small for some applications.

Accordingly, there appears to be room for improvements with regards to controlling the adhesion bond line thickness for bonding materials to each other.

SUMMARY

In view of above, it is an object of the present invention to provide a spacer clip for ensuring a minimum adhesive bond line thickness that alleviates at least one of the drawbacks of prior art.

According to a first aspect of the invention, there is provided a spacer clip for ensuring a minimum adhesive bond line thickness during an attachment event for attaching a first vehicle part with a second vehicle part, the spacer clip includes: a spacer element having a thickness defining the minimum bond line thickness, the spacer element is adapted to be arranged interleaved between the first vehicle part and the second vehicle part when attaching the first vehicle part with the second vehicle part, a hold portion generally parallel with the spacer element, the hold portion is attached to the spacer element with an interconnecting portion, wherein the spacer clip is mountable on the first vehicle part, wherein the hold portion is adapted to be arranged on an opposite side of the first vehicle part compared to the spacer element during the attachment event, wherein, the spacer element and the hold portion are adapted to maintain a pressure on the first vehicle part such that the spacer clip can be mounted on the first vehicle part prior to the attachment event and maintain mounted on the vehicle part during the attachment event.

The present invention is based on the realization of a spacer clip which may be mounted on one of the vehicle parts prior to the attachment of the vehicle parts to each other. The spacer clip may be clipped onto the first vehicle part to ensure a minimum gap between the first vehicle part and the second vehicle part, whereby the minimum gap is defined by the thickness of the spacer element of the spacer clip which thereby defines the minimum desired bond line thickness.

Advantages of the invention include improved performance of the control of the minimum bond line thickness for varying tolerances of the vehicle parts and faster manufacturing flow since the spacer clips may be clipped on the vehicle parts before the attachment event.

The hold portion and the spacer element are configured as a "clip" with a spacing between the hold portion and the spacer element. The spacer clip is configured to be clipped onto the first vehicle part with the first vehicle part in the spacing. The spacing may be an air gap.

The interconnecting portion links the spacer element to the hold portion.

The spacer element may be generally planar in order to provide improved uniformity of the bond line thickness. Furthermore, the spacer element may have a uniform thickness corresponding to the desired bond line thickness. In this way, the uniformity may be even further improved.

In embodiments, the interconnecting portion may include a resilient material such that when the spacer element and the hold portion are forced further apart from each other from a neutral position, the interconnecting portion attempts to bring the spacer element and the hold portion back to the neutral position. Thus, the resilience in the interconnecting portion may provide the required force for clipping the spacer clip onto the first vehicle part.

The spacer clip may include a plastic material such as a thermoplastic. The entire spacer clip may be formed from the same material. The spacer clip may in some embodiments be generally U-shaped which is well suitable for clipping the spacer clip onto a vehicle part.

The spacer element, the hold portion and the interconnecting portion may be made in a single piece.

According to embodiments, the spacer element may include at least one weakening groove such that the spacer clip may be separated in two pieces at the weakening grooves. This advantageously provides for improved possibilities to remove part of the spacer clip from the adhered vehicle parts after the attachment event. The part of the spacer element that is left is interleaved between the first and the second vehicle part. In one possible implementation, the weakening groove is located in the spacer element, wherein only a remaining portion of the spacer element is left interleaved between the first and second vehicle part. In another possible implementation, the weakening groove is located in the interconnecting portion, wherein when the spacer clip is separated into two pieces, the spacer element remains interleaved between the vehicle parts and at least a portion of the interconnecting portion is maintained connected with the spacer element.

Moreover, there may be more than one weakening groove in the spacer element and/or interconnecting portion. The weakening grooves may be on opposite sides of the spacer element, one on the side facing the gap between the hold portion and the spacer element, and another weakening groove on the outer surface of the spacer element.

Furthermore, there may be one or more weakening grooves in the hold portion.

Accordingly, the location of one or more weakening grooves may be tailored depending on where it is desirable to break off the spacer clip after an attachment event.

A width of the spacer element may advantageously be larger than the thickness of the spacer element. The width is taken in a plane parallel to the plane of the bond line. Thereby, the stability of the spacer clip is improved when it has been mounted on the first vehicle part.

The first vehicle part may be adapted to face the interior of a vehicle and the second vehicle part may be adapted to face the exterior of the vehicle.

The first and second vehicle part may be nearly any vehicle parts that are attached together using an adhesive. For example, one of the vehicle parts may be an exterior (interior) carbon composite (or plastic) part adhered to an interior (exterior) (e.g. metallic) flange. Alternatively, one of the vehicle parts may be a reinforcement element (e.g. carbon composite or plastic) and the other one a vehicle beam (e.g. a metallic beam). The invention is thus applicable to a vast amount of vehicle parts.

According to a second aspect of the inventive concept, there is provided a method for attaching a first vehicle part and a second vehicle part to each other, including: providing a spacer clip including a spacer element and a hold portion generally parallel with the spacer element, wherein the spacer element is connected to the hold portion with an interconnecting portion, the spacer element having a thickness defining the bond line thickness, attaching at least one spacer clip on the first vehicle part, wherein the spacer element and the hold portion are adapted to maintain a pressure on the first vehicle part in such a way that the at least one spacer clip maintains mounted on the first vehicle part, providing the second vehicle part; attaching the second vehicle part to the first vehicle part with an adhesive wherein the spacer element of the at least one spacer clip is arranged interleaved with the first vehicle part and the second vehicle part such that the thickness of the adhesive is defined by the thickness of the spacer element.

In embodiments, a plurality of spacer clips are attached on the first vehicle part with a random pitch between the spacer clips. The random pitch may be any arbitrary pitch suitable for the application.

Attaching the spacer clip on the first vehicle part may include forcing the spacer clip onto the first vehicle part with the spacer element and the hold portion on opposite sides of the first vehicle part.

According to some embodiments, the method may include braking off the spacer clip at predefined grooves in the spacer element, leaving only the remaining portion of the spacer element interleaved between the first vehicle part and the second vehicle part.

The material of the first vehicle part may be different from the material of the second vehicle part in some embodiments. For example, the first vehicle part may include metal.

This second aspect of the invention provides similar advantages as discussed above in relation to the previous aspect of the invention.

Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein:

FIG. 1A schematically illustrates a spacer clip according to embodiments of the invention;

FIG. 1B schematically illustrates a spacer clip according to embodiments of the invention;

FIG. 1C schematically illustrates a spacer clip according to embodiments of the invention;

FIG. 1D schematically illustrates a spacer clip according to embodiments of the invention;

FIG. 1E schematically illustrates a spacer clip according to embodiments of the invention;

DESCRIPTION OF EMBODIMENTS

Figure 2A:
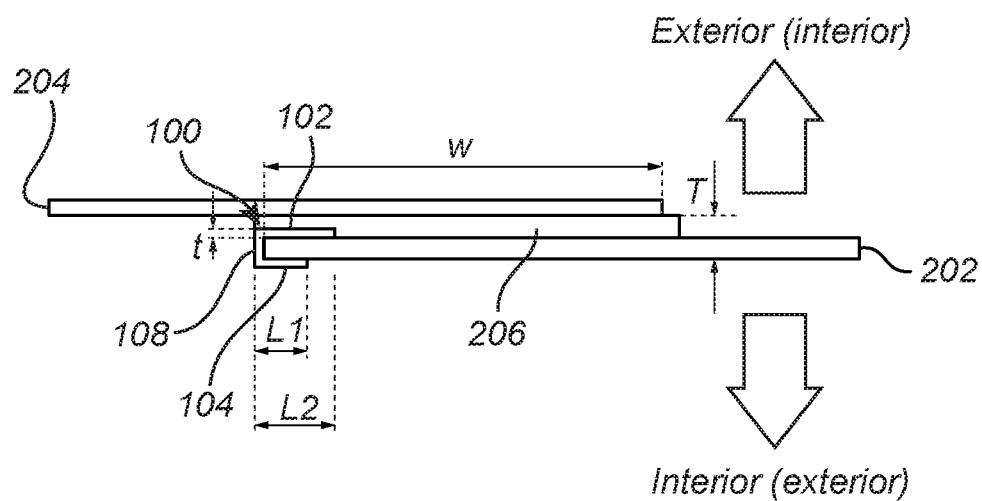
FIGS. 2A-B show conceptual views of an application of example embodiments of the invention.

In the present detailed description, various embodiments of the inventive concept are mainly described with reference to specific embodiments. The invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

FIG. 1A shows a perspective view of a spacer clip 100 according to embodiments of the invention. The spacer clip 100 includes a spacer element 102 which has a thickness t to define a minimum bond line thickness when attaching a first vehicle part with a second vehicle part using an adhesive, as will be described with reference to subsequent drawings. The spacer clip 100 further includes a hold portion 104 which is generally parallel with the spacer element 102 and spatially separated from the spacer element with a gap 106. The hold portion 104 is attached to the spacer element 102 with an interconnecting portion 108.

During an attachment event for attaching two vehicle parts to each other, the spacer clip 100 is mounted on one of the vehicle parts with the vehicle part in the gap 106 between the hold portion 104 and the spacer portion 102. The spacer element is generally planar, at least on the outer surface 110 of the spacer element 102 to provide a flat interface with the vehicle part coming in contact with the outer surface 110 at the attachment event. The flat interface provided by outer surface 110 facilitates to provide improved uniformity of the bond line thickness. Furthermore, the spacer element 102 may have a uniform thickness t corresponding to the desired bond line thickness.

FIG. 1B shows a perspective view of another spacer clip 200 according to embodiments of the invention. A difference between the spacer clip 100 described with reference to FIG.

1A and the spacer clip 200 is a weakening groove 202 in the spacer element 102 that extends across the width (L3, see FIG. 2B) of the spacer clip 200. This weakening groove 202 enables to easily break the spacer element 102 at the weakening groove 202 after the attachment event, leaving only a remaining portion 111 of the spacer element 102, which portion 111 is interleaved between the vehicle parts. The depth of the weakening groove may be at least half the thickness t of the spacer element 102, or even at least 75% of the thickness t of the spacer element 102, but at most 95% of the thickness t of the spacer element 102. A weakening groove 203 may alternatively or additionally be located on the inner side of the spacer element 102 facing the gap 106.

Moreover, a weakening groove may be located in various locations according to possible implementations of the inventive concept. For example, as illustrated in FIG. 1C presenting a possible spacer clip 300, a weakening groove 204 in the spacer element 102 may be located further away from the interconnecting portion 108 compared to the groove 202. In addition, more than one groove may be combined on spacer clip. For instance, groove 202 and groove 204.

Another example spacer clip 400 is illustrated in FIG. 1D, in which one or more weakening grooves 205, 206 have been made in the interconnecting portion 108, preferably in line with the inner surface of the spacer element 108 and/or the inner surface facing the gap 106 of the hold portion. Alternatively or additionally, a weakening groove 208 has been made on the side of the interconnecting portion facing the gap 106.

In yet another possible spacer clip 500, a weakening groove is made in the hold portion 104 as shown in FIG. 1E.

Accordingly, the location of one or more weakening grooves may be tailored depending on where it is desirable to break off the spacer clip after an attachment event.

The spacer clips 100, 200, 300, 400, 500 are preferably made from a plastic material and may be made in a single piece. The spacer clips may be manufactured by e.g. injection molding or 3D-printing techniques.

The spacer clips 100, 200, 300, 400, 400 conceptually illustrated in FIGS. 1A-E are generally U-shaped.

FIG. 2A conceptually illustrates a cross-sectional view of a first vehicle part 202 attached to a second vehicle part 204 with an adhesive 206 and with the use of a spacer clip 100. The spacer clip 100 includes a spacer element 102 with length L2 and a hold portion 104 with length L1 which is larger than L2 in this example embodiment. In other embodiments, the length L1 of the hold portion 104 may be smaller than the length L2 of the spacer element. The hold portion 104 and the spacer element 102 are interconnected via the interconnecting portion 108. The spacer element 102 is arranged interleaved between the first vehicle part 202 and the second vehicle part 204. The first vehicle part 202 is adapted to be arranged on a vehicle interior side and the second vehicle part 204 is adapted to be arranged on a vehicle exterior side. Alternatively, the first vehicle part 202 is adapted to be arranged on a vehicle exterior side and the second vehicle part 204 is adapted to be arranged on a vehicle interior side.

The hold portion 104 which is generally parallel with the spacer element 102 is arranged on an opposite side of the first vehicle part 202 compared to the spacer element 102. Thus, a portion of the first vehicle part 202 is sandwiched between the hold portion 104 and the spacer element 102. The spacer element 102 and the hold portion 104 are adapted to maintain a pressure on the first vehicle part 202 such that the spacer clip can be mounted on the first vehicle part 202 prior to attaching the second vehicle part 204 to the first vehicle part 202 with the adhesive 206.

The bond line width w is the overlapping portion between the first vehicle part 202 and the second vehicle part 204.

Figure 2B:
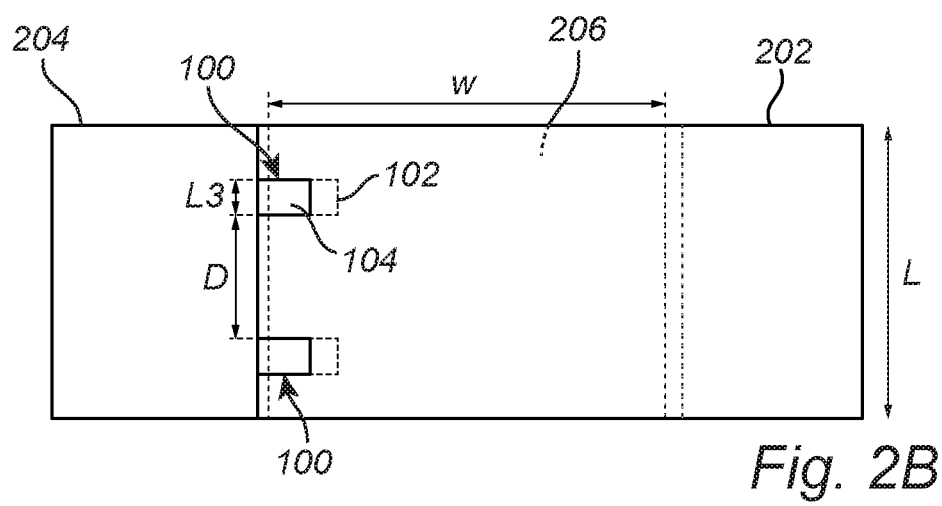

FIG. 2B conceptually illustrates the attached vehicle parts 202, 204 in FIG. 2A from the vehicle interior side, here with two spacer clips 100 arranged with a separating pitch D. The width L3 of the spacer element 102 is generally larger than the thickness t (see FIG. 2A). The bond line length (L) is the length of the adhesive bond joint between the vehicle parts 202, 204.

Figure 3:
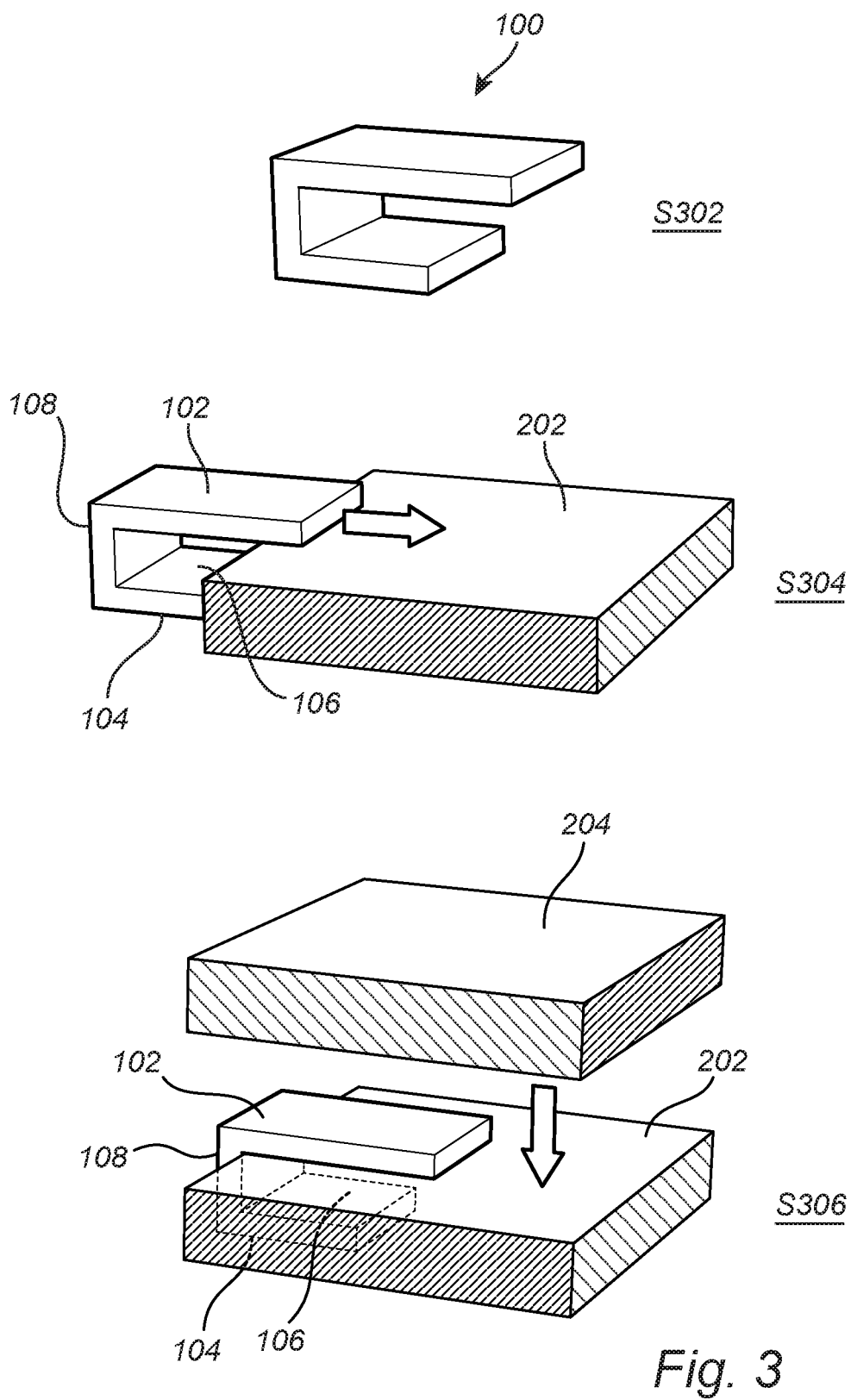
FIG. 3 conceptually illustrates an attachment event.

FIG. 3 conceptually illustrates an attachment event for attaching two vehicle parts 202, 204 to each other. A spacer clip 100 according to any one of the described embodiments is provided in step S302, although here the spacer clip 100 is illustrated.

The spacer clip 100 is attached to a first vehicle part 202 in step S304. The interconnecting portion 108 includes a resilient material such as a plastic material which, when the spacer element 102 and the hold portion 104 are forced further apart by the first vehicle part 202 being inserted in the gap 106 between the spacer element 102 and the hold portion 104, the resilient interconnecting portion 108 attempts to bring the spacer element 102 and the hold portion 104 back to the neutral position thereby applying pressure on the first vehicle part 202. In this way, the spacer clip 100 can be mounted on the first vehicle part 202 prior to the attachment event and maintain mounted on the vehicle part during the attachment event.

In step S306, a second vehicle part 204 is attached to the first vehicle part 202 with an adhesive (not shown, see FIGS. 2A-B) with the spacer element of the spacer clip 100 interleaved between the first vehicle part 202 and the second vehicle part 204 such that the minimum thickness of the adhesive is defined by the thickness of the spacer element.

Figure 4:
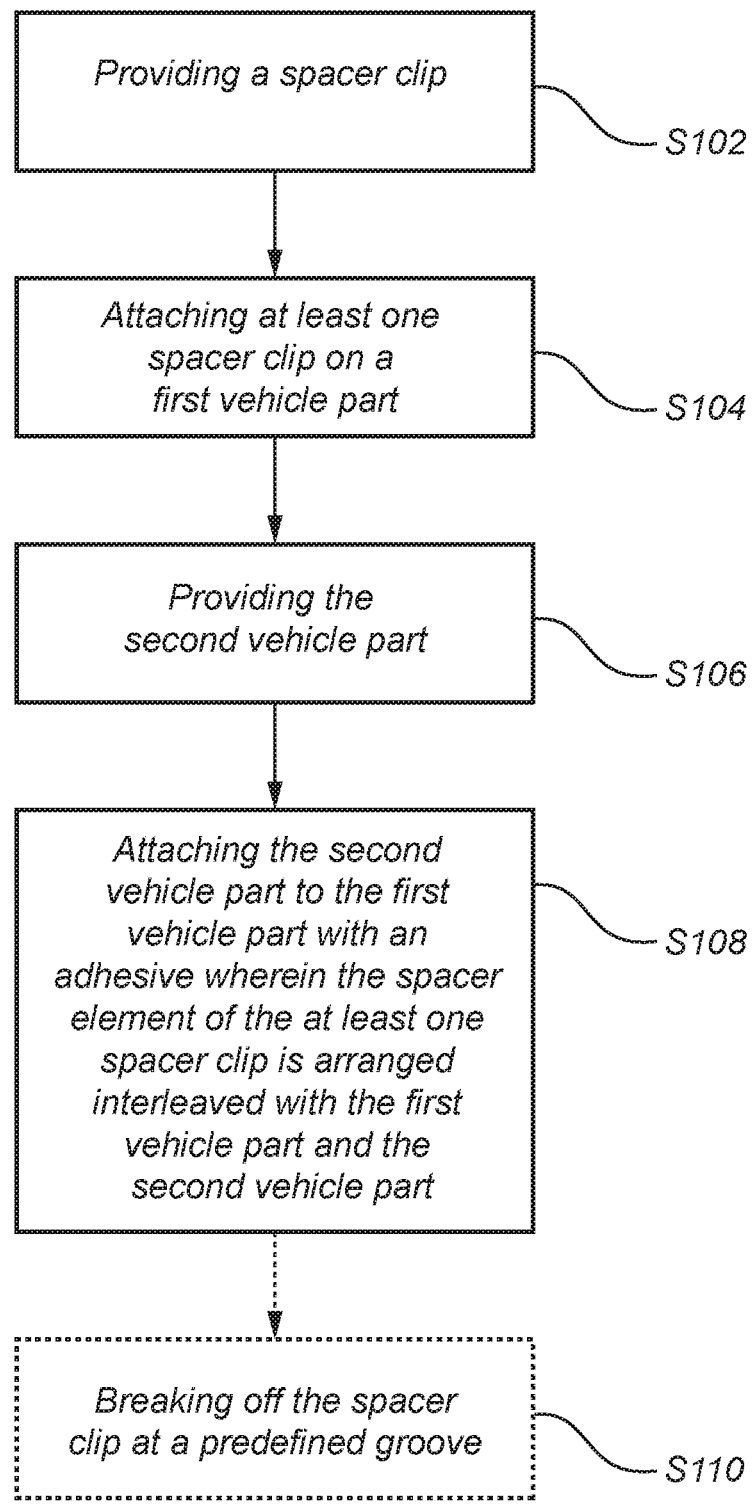
FIG. 4 is a flow chart of method steps according to embodiments of the invention.

FIG. 4 is a flow-chart of method steps according to embodiments of the invention. A spacer clip is provided in step S102. The spacer clip includes a spacer element and a hold portion generally parallel with the spacer element. The spacer element is connected to the hold portion with an interconnecting portion and the spacer element has a thickness defining the minimum bond line thickness. In step S104, at least one spacer clip is attached on the first vehicle. The spacer element and the hold portion of each spacer clip are adapted to maintain a pressure on the first vehicle part in such a way that the at least one spacer clip maintains mounted on the first vehicle part. Subsequently, in step S106, a second vehicle part is provided. The second vehicle part is attached (S108) to the first vehicle part with an adhesive, wherein the spacer element of the at least one spacer clip is arranged interleaved with the first vehicle part and the second vehicle part such that the thickness of the adhesive is defined by the thickness of the spacer element.

Optionally, according to some embodiments, the spacer clip broken off S110 at predefined grooves, is leaving only at least a remaining portion of the spacer element interleaved between the first vehicle part and the second vehicle part. The other part of the spacer clip may be removed from the remaining portion of the spacer clip.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A spacer clip for ensuring a minimum adhesive bond line thickness (T) during an attachment event for attaching a first vehicle part with a second vehicle part with an adhesive, the spacer clip comprising:
   a spacer element having a thickness (t) defining the minimum bond line thickness, the spacer element is adapted to be arranged interleaved between the first vehicle part and the second vehicle part when attaching the first vehicle part with the second vehicle part,
   a hold portion generally parallel with the spacer element, the hold portion is attached to the spacer element with an interconnecting portion, wherein the spacer clip is mountable on the first vehicle part, wherein the hold portion is adapted to be arranged on an opposite side of the first vehicle part compared to the spacer element during the attachment event, wherein,
   the spacer element and the hold portion are adapted to maintain a pressure on the first vehicle part such that the spacer clip can be mounted on the first vehicle part prior to the attachment event and maintain mounted on the vehicle part during the attachment event,
   wherein the spacer clip comprises at least one weakening groove such that the spacer clip may be separated in two pieces at the weakening grooves.

2. The spacer clip according to claim 1, wherein the spacer element is generally planar.

3. The spacer clip according to claim 1, wherein the spacer element has a uniform thickness (t) corresponding to the minimum bond line thickness.

4. The spacer clip according to claim 1, wherein the interconnecting portion comprises a resilient material such that when the spacer element and the hold portion are forced further apart from each other from a neutral position, the interconnecting portion attempts to bring the spacer element and the hold portion back to the neutral position.

5. The spacer clip according to claim 1, wherein the spacer clip comprises a plastic material.

6. The spacer clip according to claim 1, wherein the spacer clip is generally U-shaped.

7. The spacer clip according to claim 1, wherein the spacer element, the hold portion and the interconnecting portion are made in a single piece.

8. The spacer clip according to claim 1, wherein a width (L3) of the spacer element is larger than the thickness of the spacer element.

* * * * *